United States Patent

[11] 3,617,543

| [72] | Inventor | Edward W. Smith<br>P.O. Box 21, Milton, N.H. 03851 |
|---|---|---|
| [21] | Appl. No. | 860,675 |
| [22] | Filed | Sept. 24, 1969 |
| [45] | Patented | Nov. 2, 1971 |

[54] FILTERING AND CONCENTRATING MEANS AND METHOD
9 Claims, 2 Drawing Figs.

[52] U.S. Cl. ................................................ 210/19,
210/77, 210/388, 210/391
[51] Int. Cl. ...................................................... B01d 33/06,
B01d 35/20
[50] Field of Search ......................................... 210/19, 77,
79, 388, 393, 399, 404, 331, 391, 412

[56] References Cited
UNITED STATES PATENTS

| 1,658,650 | 2/1928 | Pleister .......................... | 210/19 |
|---|---|---|---|
| 1,945,492 | 1/1934 | Lamort .......................... | 210/388 X |
| 2,392,666 | 1/1946 | Harris ............................. | 210/388 |
| 2,781,916 | 2/1957 | Coleman ......................... | 210/393 |
| 2,964,193 | 12/1960 | Heckmann ..................... | 210/388 X |
| 3,190,449 | 6/1965 | Muller ............................. | 210/331 X |
| 3,241,676 | 3/1966 | Neuville et al. ................ | 210/77 |
| 3,463,727 | 8/1969 | Fahey .............................. | 210/19 |
| 3,437,208 | 4/1969 | Kaspar et al. ................... | 210/331 X |

*Primary Examiner*—Samih N. Zaharna
*Attorney*—Wolf, Greenfield & Sacks

ABSTRACT: An apparatus for filtering and concentrating liquid slurries and the like is provided comprising a container having encircling filter screen mounted about an axis in a container for torsional oscillation about the axis. Means are provided for torsionally oscillating the screen with respect to the container whereby liquid is removed from a liquid particle mass in the container after it passes through the screen and the particles remain in the mass with little or no tendencies to clog the screen. The method of this invention comprises establishing a shearing action between the screen and the liquid particle mass, setting up a first liquid flow into the screen and a second pulsating liquid flow out of the screen with the second flow having predetermined peak magnitudes greater than the first flow whereby particles in the liquid mass remain in the mass and the liquid passes through the screen and is filtered.

PATENTED NOV 2 1971   3,617,543

INVENTOR
EDWARD W. SMITH
BY
Wolf, Greenfield Hieken & Sacks.
ATTORNEYS

FILTERING AND CONCENTRATING MEANS AND METHOD

BACKGROUND OF THE INVENTION

In a wide variety of industries it is sometimes necessary to separate liquid slurries of liquids containing particles in order to obtain filtered liquids or to form more concentrated slurries. The term "particle" as used herein is meant to include fibers, regular and irregular shaped masses, powders and the like which are suspended or entrained in liquids.

For example, in the paper manufacturing industry, white water, i.e., water carrying pulp fibers collected from under the screen of a Fourdrinier paper making machine can be reused for forming paper if the white water can be concentrated efficiently to raise the pulp fiber content of the slurry sufficiently high. In the paper coating industry, liquids containing particles are filtered to remove lumps of adhesive and titanium oxide in slick coated paper materials. In the food industry, cooking oil used to fry items such as french fried potatoes can be reused by filtering the particles from the oil used.

Many problems arise in filtering and concentrating in these and other industries. One major problem is blockage of the filter used by the particles suspended in a liquid. In an attempt to overcome this problem, planar screens have been used as filtering screens and in some cases oscillated. However, when sufficiently high oscillations are imparted to such screens to prevent clogging of the screens, often severe damage occurs to the screens.

It is an object of this invention to provide a filtering and concentrating means and method for filtering liquids and/or concentrating mixtures of liquids and particles in a continuous manner.

Another object of this invention is to provide a means and method in accordance with the preceding object which is capable of efficient operation over long time periods.

Still another object of this invention is to provide a means in accordance with the preceding objects which comprises a torsionally oscillating filtering screen which is substantially self-cleaning and nonclogging.

SUMMARY OF THE INVENTION

According to the invention, a filtering and concentrating apparatus for filtering and/or concentrating mixtures of liquids and particles has an encircling or tubular filter screen preferably mounted about an axis for torsional oscillation about the axis. A means is provided for torsionally oscillating the filter screen with respect to a container in which the screen is mounted. Means are provided for removing a liquid which passes through the screen from the container. Preferably the screen is generally cylindrical and carries means mounted within it for causing slight backflow of liquid through the screen when the screen is torsionally oscillated.

According to the method of this invention, a mass of a liquid carrying particles to be filtered therefrom is established. An encircling filter screen having a shearing action is positioned in the mass and a first liquid flow is set up into the screen with a second liquid flow being established out of the screen with the second flow having peak magnitudes greater than the first flow. The first flow is then directed to an outlet means with the particles remaining substantially in the original mass.

It is a feature of this invention that a torsionally oscillating shearing force can be set up between the filter screen and the liquid in which it is submerged in the container. The shearing force acts to prevent particle buildup which would tend to clog the screen. Another feature of the invention includes the use of a high frequency, pulsating backflow of filtered liquid through the screen which assists in detaching any particles which may become temporarily clogged in the screen. Because of the torsional oscillation, any substantial force applied to the screen to move it with relation to the liquid in which it is submerged is in the curved plane of the screen at any point and this avoids undue stress on the filter screen itself.

BRIEF DESCRIPTION OF THE DRAWINGS

The above and other objects, advantages and features of the present invention will be better understood form the following specification when read in connection with the accompanying drawings in which.

DESCRIPTION OF PREFERRED EMBODIMENTS

Figure 1:
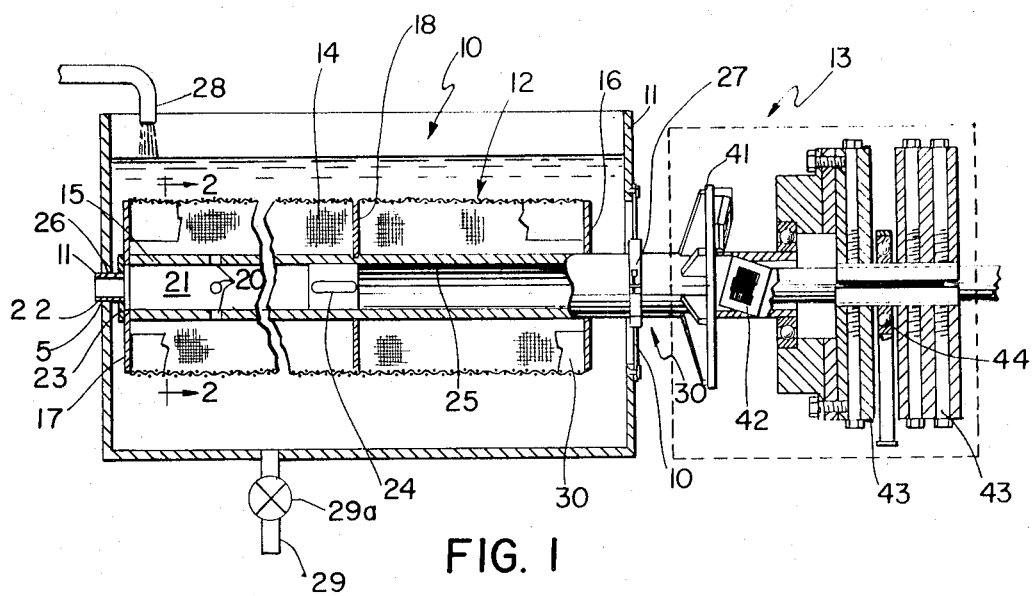
FIG. 1 is a semidiagrammatic cross-sectional view through the center of an apparatus in accordance with the present invention.

With reference now to the drawings, a filtering and concentrating apparatus in accordance with the preferred embodiment of the invention is illustrated generally at 10 and comprises a rectangular container 11 within which is mounted a torsionally oscillating filter screen arrangement 12 interconnected with a torsionally oscillating drive mechanism generally indicated semidiagrammatically at 13.

The arrangement 12 has a tubular torsionally oscillating filter screen 14 in the form of a cylinder coaxially mounted on a preferably cylindrical torque tube 15. The filter screen can have extremely small mesh sizes in accordance with this invention. For example, in the preferred device, the diameter of the screen is 9 inches, the length of the screen is 6 feet and the screen has an ASTM mesh size of 200 mesh, i.e., 40,000 holes per square inch. Mesh sizes in the range of from 40 mesh to at least 325 mesh can be used. The screen material can be of any suitable material including plastics and metals and is bronze in the preferred embodiment.

The mounting of the screen on the torque tube 15 is preferably by means of two donut-shaped end plates 16 and 17 which close the ends of the cylinder formed by the screen and are welded at their inside and outside diameters to the tube 15 and screen 14 respectively. Stiffening ribs are preferably provided such as pie-shaped ribs 18 secured to the torque tube 15 and screen as shown, preferably lying in planes parallel to the planes of the end plates 16 and 17. Preferably eight stiffening ribs are uniformly distributed about the circumference of the screen and groups of ribs 18 are preferably positioned at 12 inch, intervals along the length of the torque tube 15. The particular means for stiffening the screen can vary greatly as will be obvious to those skilled in the art.

The torque 15 is preferably a metallic tube which has good mechanical strength properties and may be, for example, a steel tube having a thickness of 1 inch with an inside diameter of 2 ½ inch. Liquid drain holes 20 are provided preferably at 90° positions about the circumference of the shaft. In the preferred embodiment, four drain holes 20 are provided leading to the hollow center 21 of the shaft.

A hollow cylindrical axle 22 is welded to a closure plate 23 joined to end plate 17, and provides a means of removing filtered liquid from the inside of the screen by passage of the liquid through the holes 20 and out of the hollow center of the axle 22 which forms an outlet. A suitable pump can be connected to or incorporated in the axle 22 if desired. The torque tube 15 is welded as at points 24 to a torsionally oscillating drive shaft 25 which preferably fits within tube 15.

A filter screen assembly 12 is mounted for torsional oscillating movement preferably with its axis horizontally located within container 11. Suitable liquidtight bearings 26 and 27 are provided to allow torsional oscillation of the torque tube as will be described. The container 11 may be of any shape although in the preferred embodiment it is shown as a generally rectangular trough provided with an outlet or drain pipe 29 (preferably provided with a gate valve 29a) and an inlet or filling pipe 28. Bearing 27 comprises a conventional split bearing assembly to enable mounting of the tube 15 within the container for torsional oscillation. Mounting may be carried out by any known means. While it is preferred that the filter screen be operated in a horizontal position, it is possible to mount the screen vertically or at inclinations if desired. Similarly, the length and diameter of the screen can vary greatly.

In all cases, it is preferred that the openings 20 have a total area which is greater than the area of the outlet passage formed by axle 22 so as to provide minimized flow restriction to liquid passing from the inside face of the screen 14 into the interior of the tube 15 and from there to the outlet passageway formed by the axle 22. These holes 20 are preferably located in close proximity to the distal end of the torque tube 15 away from the driving mechanism 13 since the holes tend to weaken the torque tube 15 insofar as transmission of the torque necessary to oscillate the screen and its supporting structures is concerned.

Figure 2:
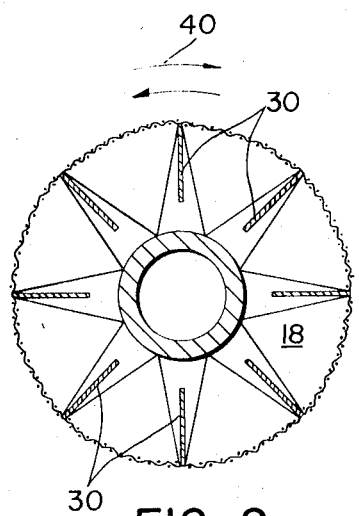
FIG. 2 is a cross-sectional view of an element of the apparatus taken through line 2—2 of FIG. 1.

In the preferred embodiment, eight flat metallic plates or vanes 30 are provided which extend radially of the axis of the screen 14 along the length of the screen assembly and are equally spaced about the circumference of the screen. These vanes preferably have a radial extent such that the ratio of their radial length of the radius of the screen is no higher than 1 to 3 and are 2 to 3 inch in radial length in the preferred embodiment and are preferably positioned between the pie-shaped stiffening ribs 18 as best shown in FIG. 2. The vanes are firmly attached to the screen and preferably additionally welded or otherwise secured to adjoining stiffening ribs and to the end plates 16 and 17 with the vanes preferably extending the full axial length of the screen 14.

The torsionally oscillating drive mechanism 13 is of conventional design and can for example be constructed as described in U.S. Pat. No. 2,604,503 issued July 22, 1952. Thus, an armature base ring 41, E-shaped field lamination blocks 42, compensating inertia members 43 and bearing 44 are provided as is known in the art. In the preferred embodiment 10, the drive mechanism 13 is designed so that the mass moment of inertia of the oscillated parts is 1389 p.s.i., the angular amplitude of motion in radians of the cylindrical screen is 0.055 and the frequency is 60 cycles per second.

In operation of the apparatus 10, the drive mechanism is activated to reciprocally torsionally oscillate the filter screen 14 through the torque shaft 15 in the directions of arrows 40, a slurry such as a white water paper fiber slurry is introduced to the container above the top level of the screen and the outlet 29 is closed. An oscillating frequency of 60 cycles per second with an excursion at the surface of the screen of around one-fourth inch can be used. The liquid slurry containing particles such as paper pulp is concentrated within the tank 11 since liquids is removed through the screen and outlet formed by axle 22. When one of the suspended particles reaches the screen it is deterred from remaining on the surface of the screen by the high-speed shearing action between the surface of the screen and the liquid slurry itself and thus the particle is thrown off. Of course the screen has hole sizes smaller than the particles encountered in the slurry. In addition to the shearing action caused by the torsional oscillation, a further factor aids in giving a self-cleaning, nonclogging characteristic to the screen. The radial vanes 30 which are oscillated along with the screen tend to set up a backflow through the screen to force a certain amount of the filtered liquid from within the screen back through the screen thus further tending to dislodge, from the external surface of the screen, any particles which may have formed a temporary lodgment there in spite of the above-mentioned shearing action between the screen surface and the liquid slurry. The relatively constricted space between the inner ends of the vanes 30 as compared with the larger space at the outer ends of the vane 30 at the screen inner surface, tends to accentuate the periodic pulsing backflow of filtered liquid back through the screen to assist in the dislodging of particles from the screen surface without more than slightly affecting the rate of desired separation of particles from the liquid in which they are suspended.

After operation of the device as described in the preceding paragraph, the concentrated slurry remaining in tank 11 can be drawn off through the outlet 29.

In a specific example of this invention, utilizing the preferred embodiment 10, a white water slurry is introduced through inlet 28 at a flow rate of 1,800 gallons per hour. It is found that the slurry is highly concentrated and can be removed from time to time through the outlet pipe 29.

In alternate embodiments of the invention, the shearing action can be obtained by other means that the torsionally oscillating drive mechanism 13. For example, a simple rotating drive motor can be used to provide sufficient rotational speed to create shearing action at the screen-liquid interface. In some cases, the pulsating backflow can be provided by maintaining the outlet area in outlet 22 less than the area of the openings provided by openings 20. An intermittent pumping action in outlet 22 can provide a pulsating backflow of liquid.

While specific embodiments of this invention have been shown and described, it will be obvious to those skilled in the art that many variations thereof are possible. For example, the particular configuration of the tank 11 as well as the torque tube 15, vanes 30 and stiffening ribs 18 can vary considerably. Sizes of components as well as specific bearings and the like may also vary. In some cases, the outlet 29 can be left open continuously and have a restricted size to allow a continuous drain off of concentrated slurry with continuous filling through pipe 28 during operation of the device. The device can be used for concentrating liquid suspensions of all types carrying particles of all types.

What is claimed is:

1. A filtering and concentrating apparatus comprising a container,
   a tubular filtering screen mounted about an axis for torsional oscillation about said axis,
   vane means mounted within said screen for causing slight backflow of liquid through said screen at periodic intervals when said screen is torsionally oscillated,
   means for torsionally oscillating said screen with respect to said container,
   and means for removing liquid from said container which liquid passes through said screen and by said vane means.

2. A filtering and concentrating apparatus in accordance with claim 1 wherein said screen is cylindrical.

3. A filtering and concentrating apparatus in accordance with claim 2 wherein said screen is mounted on a torque tube,
   means in said torque for withdrawing liquid passed through said screen from said container,
   said vane means comprising a plurality of vanes extending radially inwardly from said screen toward said axis.

4. A filtering and concentrating apparatus in accordance with claim 3 wherein said axis is substantially horizontal.

5. A filtering and concentrating apparatus in accordance with claim 4 wherein said container defines means for passing a liquid and particle mixture into said container and means for draining said mixture from said container independently of said filtering screen.

6. A method of filtering and concentrating comprising,
   establishing a mass of a liquid carrying particles to be filtered therefrom,
   torsionally oscillating a tubular filter screen having inwardly extending vanes, in said liquid to set up a shearing action between said screen and said liquid, and setting up a first liquid flow into said screen and a second liquid flow out of said screen with said second flow being of less magnitude than said first flow and having peak magnitudes greater than said first flow,
   said first flow being directed to an outlet means whereby particles in said liquid remain in said mass and said liquid passes through said screen and is filtered thereby.

7. A method of filtering and concentrating comprising,
   establishing a mass of liquid-carrying particles to be filtered therefrom,
   providing a tubular filter screen in said liquid with said screen having inwardly extending vanes,
   establishing a shearing action between said screen and said liquid, and setting up a first liquid flow into said screen and a second pulsating liquid flow out of said screen with said second flow having peak magnitudes greater than said first flow, said first flow being directed to an outlet means whereby particles in said liquid mass remain in said mass and said liquid passes through said screen and is filtered thereby.

8. A filtering and concentrating apparatus in accordance with claim 3 and further comprising, end plates extending between said torque tube and said screen, said torque defining at least one opening to enable removal of liquid through the interior of said torque tube.

9. A filtering and concentrating apparatus in accordance with claim 8 and further comprising a plurality of support members intermediate said screen and said tube for supporting said screen, said vanes being uniformly spaced about the circumference of said cylindrical filtering screen and extending between said end plates.